US009178854B2

(12) United States Patent
Wang et al.

(10) Patent No.: US 9,178,854 B2
(45) Date of Patent: Nov. 3, 2015

(54) DIFFERENTIATION OF MULTIPLE MEDIA ENDPOINTS BEHIND AN ADDRESS TRANSLATION DEVICE

(75) Inventors: Jianxin Wang, San Jose, CA (US); Hien Thi Thai, Elk Grove, CA (US); Anupama Anand, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1194 days.

(21) Appl. No.: 12/833,638

(22) Filed: Jul. 9, 2010

(65) Prior Publication Data

US 2012/0008619 A1  Jan. 12, 2012

(51) Int. Cl.
  *H04L 12/56* (2006.01)
  *H04L 29/06* (2006.01)
  *H04L 29/12* (2006.01)

(52) U.S. Cl.
  CPC ......... *H04L 63/029* (2013.01); *H04L 29/12367* (2013.01); *H04L 29/12377* (2013.01); *H04L 61/2514* (2013.01); *H04L 61/2517* (2013.01)

(58) Field of Classification Search
  CPC ............ H04L 63/029; H04L 29/12367; H04L 29/12377; H04L 61/2517; H04L 61/2514
  See application file for complete search history.

(56) References Cited

U.S. PATENT DOCUMENTS

| | | | |
|---|---|---|---|
| 6,480,508 B1 | 11/2002 | Mwikalo et al. | |
| 7,369,537 B1 | 5/2008 | Kirchhoff et al. | |
| 2005/0246173 A1* | 11/2005 | Creamer et al. | 704/270 |
| 2007/0291650 A1* | 12/2007 | Ormazabal | 370/244 |
| 2008/0013533 A1* | 1/2008 | Bogineni et al. | 370/389 |
| 2009/0180476 A1* | 7/2009 | Lee et al. | 370/392 |
| 2010/0088396 A1* | 4/2010 | Armerding | 709/218 |
| 2010/0166153 A1* | 7/2010 | Guleria et al. | |
| 2010/0217874 A1* | 8/2010 | Anantharaman et al. | 709/228 |
| 2010/0248772 A1* | 9/2010 | Denman et al. | 455/518 |
| 2011/0191487 A1* | 8/2011 | Ziems | 709/231 |
| 2012/0216272 A1* | 8/2012 | Hunyady et al. | 726/12 |

OTHER PUBLICATIONS

J. Rosenberg et al., *Traversal Using Relays around NAT (TURN): Relay Extensions to Session Traversal Utilities for NAT (STUN)*, Jul. 3, 2009 accessed via http://tools.ietf.org/html/draft-ietf-behave-turn-16.
U.S. Appl. No. 12/507,315, filed Jul. 22, 2009, by Hien Thai et al.

* cited by examiner

*Primary Examiner* — Luat Phung

(57) ABSTRACT

In one embodiment, two way communication between an IP phone behind a firewall and an IP phone behind a translation device is established. A network security device receives a remote packet from the translation device. The header of the remote packet includes the address of the translation device, and a payload of the remote packet includes an embedded remote address and the media port of the IP phone behind the translation device. A memory stores the media port matched with the address of the translation device. When the network security device receives a local packet from the IP phone behind the firewall destined for the IP phone behind the translation device, a controller rewrites the destination port of the local packet with the media port.

19 Claims, 6 Drawing Sheets

109

| PAT Device Address | IP Phone Media Port |
|---|---|
| 133.9.0.41 | 32746 |
| 125.149.5.70 | 53790 |
| 122.135.4.21 | 48624 |
| | |
| | |
| | |

FIG. 3

| PAT Device Address | Possible Mapped Address | Need Fixup |
|---|---|---|
| 133.9.0.41 | 192.168.1.10 | X |
| 125.149.5.70 | 125.149.5.70 | |
| 122.135.4.21 | 192.168.5.13 | X |
| | | |
| | | |
| | | |
| | | |

FIG. 5

| Local Address | Remote Address | Port | Fixed Port |
|---|---|---|---|
| 10.1.1.110 | 133.9.0.41 | 22528 | 32746 |
| 195.168.2.215 | 122.135.4.21 | 65401 | 48624 |
| | | | |
| | | | |
| | | | |
| | | | |

FIG. 6

DIFFERENTIATION OF MULTIPLE MEDIA ENDPOINTS BEHIND AN ADDRESS TRANSLATION DEVICE

TECHNICAL FIELD

The present embodiments generally relate to a packet switched network (PSN).

BACKGROUND

Voice over Internet Protocol (VoIP) generally describes the transmission of voice communication over IP networks. VoIP typically utilizes an Internet protocol (IP) phone. An IP phone may be hardware based or software based. Software-based IP phones are implemented on personal computers. Hardware-based IP phones are stand alone devices that resemble conventional telephones that operate on the plain old telephone system (POTS).

Some IP phones may operate on a network that includes an address translation device. Network Address Translation (NAT) modifies IP address and port information (e.g. transmission control protocol (TCP) or user datagram protocol (UDP)) in packet headers. A NAT device has IP addresses in a public address space. The devices on the internal network are assigned addresses in a private address space. The NAT device maps the private address space to an IP address in the public address space so that returning traffic can reach the internal devices. A specific type of NAT, Port Address Translation (PAT), involves the translation of both IP address and port numbers into a single IP address, that is the translation device's address. PAT devices are common in home or remote offices. IP phones on the internal network that rely on an address translation device may not communicate properly with IP phones on other networks.

BRIEF DESCRIPTION OF THE DRAWINGS

FIG. 3 illustrates one embodiment of an address translation database implemented in the network security device of FIG. 1.

FIG. 5 illustrates one embodiment of a fixup address database.

FIG. 6 illustrates one embodiment of a promoted connection database.

DESCRIPTION

Overview

Figure 1:
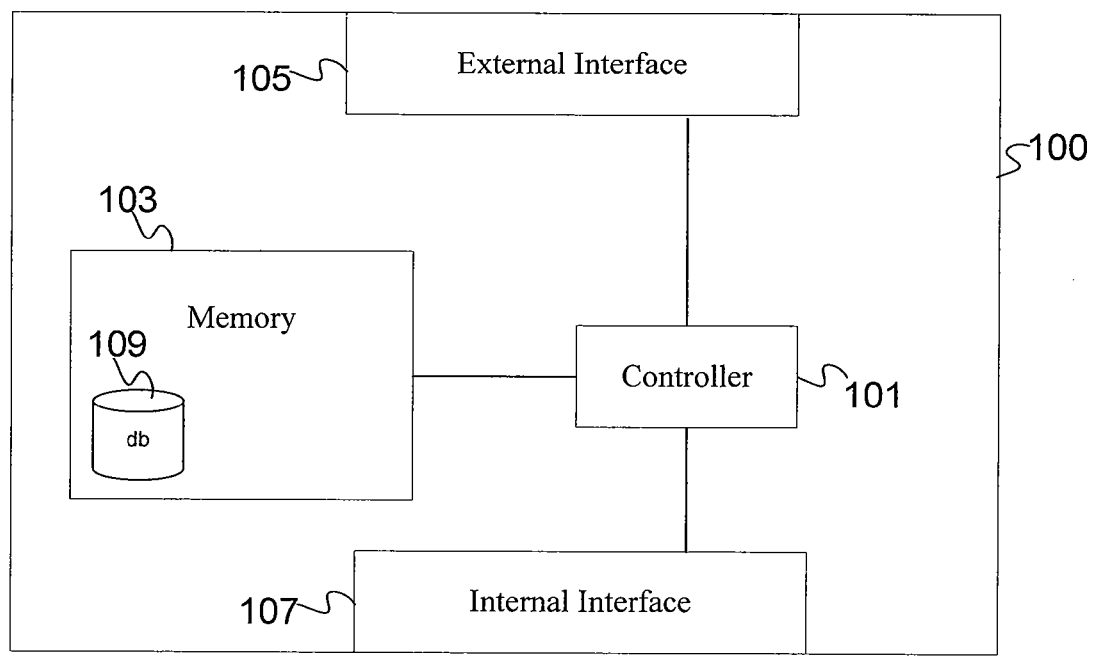
FIG. 1 illustrates one embodiment of a network security device.

The example embodiments below establish two-way communication between IP phones. One of the IP phones may be behind a network security device, such as a firewall. The other of the IP phones may be behind a translation device, such as a NAT device or a PAT device. There are two types of connections between the IP phones: call control connection and media connection. Media connections are set up as a result of the call control message exchange. The media IP address and port that are used to establish the media connection are carried in the call control packet. The media IP address may be the same as the control IP address, but the ports are different.

Typically, two-way communication is not possible in this type of arrangement because the media address and port, carried in the call control packets from the IP phones behind a translation device, are private and cannot be reached from the public network, or, the control port is presented as the media port. The example embodiments below detect the translated public media IP address and port and change media packets, originating with the IP phone behind the firewall, to include the correct public IP address and media port. Thus, the media packets reach the proper endpoint at the IP phone behind the translation device. The example embodiments may be implemented in a network security device including the firewall. In other words, the example embodiments may adjust network traffic at the firewall in a first network to insure media packets reach an IP phone behind a translation device in a second network.

In one aspect, an apparatus includes a memory, an internal interface, and a controller. The memory stores an address database including a media port of a remote device matched with an address of a translation device. The internal interface receives a local packet including a destination address that corresponds to the address of the translation device. The controller is configured to query the address database with the destination address and rewrite a destination port of the local packet with the media port of the remote device.

In a second aspect, a method includes storing an address database in a memory, wherein the address database includes a media port of a remote device matched with an address of a translation device, receiving a local packet at an internal interface, wherein the local packet includes a destination address that corresponds to the address of the translation device, querying the address database with the destination address, and rewriting a destination port of the local packet with the media port of the remote device.

In a third aspect, logic is encoded in one or more tangible media for execution and, when executed, operable to store an address database in a memory, wherein the address database includes a media port of a remote device matched with an address of a translation device, receive a local packet at an internal interface, wherein the local packet includes a destination address that corresponds to the address of the translation device, query the address database with the destination address, and rewrite a destination port of the local packet with the media port of the remote device.

EXAMPLE EMBODIMENTS

Network translation devices are common in home offices and remote offices. Remote workers rely on IP Phones behind the network translation device to communicate. Because the IP phones are behind network translation device, IP phones are assigned with private IP addresses. Network translation devices (PAT devices) in remote offices or home office do not have the capability to "fixup" embedded addresses and ports used to distinguish control from media in VoIP.

If the packets containing private address/port are delivered as is, media packets reach a wrong port on the remote. The user in the home office on a first network experiences a one-way audio conversation with the user in the corporate office on a second network. However, a network security device on the second network may be used to find the correct media port even if the port embedded in the call control packets is wrong.

The example embodiments may be implemented in a network security device as a transparent proxy. A transparent proxy, which may also be referred to as an intercepting proxy server, combines a proxy server with a router. A transparent proxy may include network address translation (NAT) abilities. A transparent proxy is transparent to clients and servers because they are unaware of the presence of the proxy device. Clients send packets to the server directly, rather than to the proxy, however, the proxy intercepts, examines and modifies (if needed) the packets.

FIG. 1 illustrates one embodiment of a network security device 100, which may be a transparent proxy. The network security device 100 includes a memory 103, a controller 101, an external interface 105, and an internal interface 107. The memory 103 includes an address database 109. Additional components may be provided. For example, the network security device 100 may include a wireless communication system, such as a radio, for communicating wirelessly. In addition, the network security device 100 may include a power supply. Controller 101 may be coupled with the other components via a bus, circuit, wire, cable, network (e.g., wired or wireless), or other connection. The network security device 100 may be a firewall. As used herein, "coupled with" includes directly connected or indirectly connected through one or more intermediary components. Intermediary components may include hardware and/or software.

The memory 103 may be a volatile memory or a non-volatile memory. The memory 103 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 103 may include an optical, magnetic (hard drive) or any other form of data storage device. The memory 103 may be located in a remote device or removable, such as an SD memory card.

The memory 103 may store computer executable instructions. The controller 101 may execute computer executable instructions. The computer executable instructions may be included in computer code. The computer code may be stored in the memory 103. The computer code may be written in any computer language, such as C, C++, C#, Java, Pascal, Visual Basic, Perl, HyperText Markup Language (HTML), JavaScript, assembly language, and any combination thereof.

The computer code may be logic encoded in one or more tangible media for execution by the controller 101. Logic encoded in one or more tangible media for execution may be defined as instructions that are executable by the controller 101 and provided on the computer-readable storage media, memories, or a combination thereof.

The controller 101 may include a general processor, digital signal processor, application specific integrated circuit, field programmable gate array, analog circuit, digital circuit, combinations thereof, or other now known or later developed processor. The controller 101 may be a single device or combinations of devices, such as associated with a network or distributed processing. Any of various processing strategies may be used, such as multi-processing, multi-tasking, parallel processing, remote processing, centralized processing or the like. The controller 101 may be responsive to or operable to execute instructions stored as part of software, hardware, integrated circuits, firmware, micro-code or the like. The functions, acts, methods or tasks illustrated in the figures or described herein may be performed by the controller 101 executing instructions stored in the memory 103. The functions, acts, methods or tasks are independent of the particular type of instructions set, storage media, processor or processing strategy and may be performed by software, hardware, integrated circuits, firmware, micro-code and the like, operating alone or in combination, and for implementing the processes, techniques, methods, or acts described herein.

External interface 105 and internal interface 107 may each include any operable connection, such as one or more ports. External interface 105 is configured to be operably connected with an external or public network. The internal interface 107 is configured to be operably connected with an internal network. An operable connection may be one in which signals, physical communications, and/or logical communications may be sent and/or received. An operable connection may include a physical interface, an electrical interface, and/or a data interface. Alternatively, the functions of external interface 105 and internal interface 107 may be implemented as an egress interface and an ingress interface. The egress interface sends data packets to both the internal network and the external network. The ingress interface receives data packets from both the internal network and the external network. As a second alternative, external interface 105 and internal interface 107 may be implemented using a single communication interface.

Figure 2:
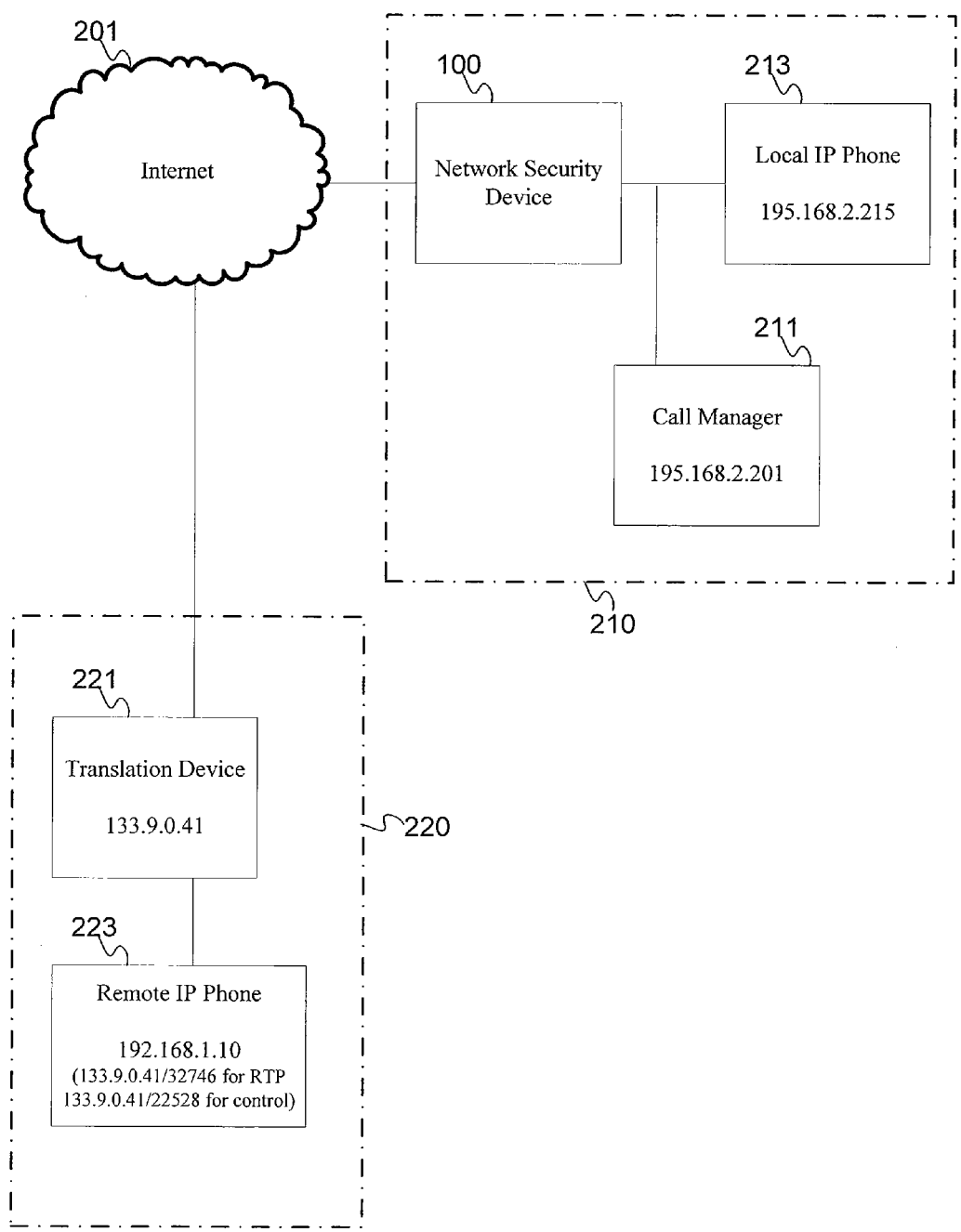
FIG. 2 illustrates one embodiment of a network implementing the network security device of FIG. 1 and a PAT device.

FIG. 2 illustrates one embodiment of a network implementing the network security device 100 of FIG. 1. In this example, the network security device 100 is coupled with the local network 210. The network security device 100 may include a firewall. The local network 210 is coupled with a local IP phone 213 and a call manager 211. The local network 210 is in communication with remote network 220, either directly or via the Internet 201. The remote network 220 includes a translation device 221 and a remote IP phone 223. The translation device 221 may be a PAT device.

One example of the call manager 211 is the Cisco Unified Communication Manager (CUCM). CUCM is software based call-processing system that tracks active VoIP network components (e.g., phones, gateways, bridges, security devices). CUCM may use the Skinny Call Control Protocol (SCCP) between endpoints (e.g., phones). CUCM may also use Session Initiation Protocol (SIP) or Media Gateway Control Protocol (MGCP) to pass signaling to gateways. CUCM evaluates called telephone numbers and then activates gateway events to send or receive calls to an Internet Protocol (IP) network or to the Public Switched Telephone Network (PSTN). Other call managers may be used.

SCCP is a signaling protocol between a Skinny client and call manager 211. For example, a Cisco 7900 IP phone uses TCP/IP to communicate with a call manager application in a cluster. SCCP is a TCP/IP based application layer call control protocol. When security is desired, SCCP messages are transported over Transport Layer Security (TLS).

SIP is a signaling protocol used to set up and tear down communication sessions (e.g., VoIP calls) on the Internet. SIP is a TCP/IP based application layer protocol. SIP uses an HTTP-like request/response transaction model. Transactions have a client request that invoke a server function that produces at least one response. The requests and responses have header fields that carry address information. An SIP user agent (UA) is a logical network end point that is used to create or receive SIP messages and to manage an SIP session. An SIP UA may be a client (UAC) or a server (UAS). Resources in an SIP network are identified by a unique resource identifier (URI) (e.g., sip:username:password@host.port). When security is desired, SIP messages are transported over TLS.

VoIP calls are made of VoIP packets. The Real-time Transport Protocol (RTP) defines a standardized packet format for delivering VoIP calls. RTP may use media streams controlled by MGCP, SCCP, or SIP signaling protocols. An IP phone may have a port, designated as a media port, for receiving RTP packets or VoIP packets.

The network of FIG. 2 including another network security device (not shown), without the benefit of the network security device 100 including the address database 109 of the example embodiments, cannot establish a full connection between remote IP phone 223 behind translation device 221 and the local IP phone 213. The VoIP packets traveling from remote IP phone 223 arrive at local IP phone 213 as planned. However, the VoIP packets traveling from local IP phone 213 to remote IP phone 223 are sent to an incorrect port number and do not arrive at the intended destination. The result is a one way phone conversation. The caller at local IP phone 213 hears the caller at remote IP phone 223, but the caller at remote IP phone 223 does not hear the caller at local IP phone 213.

More than one IP phone may be behind a NAT device and various techniques may be used to provide security information to one or more IP phones using a phone proxy. For example, a phone proxy may build a database of secure phones that have successfully downloaded a respective phone proxy configuration file and a certificate trust list. Entries in the database can be differentiated by, for example, a source IP address associated with the IP phone, a source port associated with the IP phone, and a MAC address associated with the IP phone. The phone proxy may be able to distinguish IP phones located behind a NAT based on signaling. In one example, the phone proxy can rewrite packets going from an IP phone to a call manager and from the call manager to IP phone. The phone proxy intercepts and buffers the phone configuration file and rewrites certain fields in the file.

The network of FIG. 2, without the benefit of the network security device 100 including the address database 109 of the example embodiments, follows the following procedure when local IP phone 213 places a call to remote IP phone 223.

The local IP phone 213 communicates with the call manager 211. The local IP phone 213 and remote IP phone 223 have already registered with the call manager 211. The call manager 211 includes a configuration entry that lists the remote IP phone 223 as having a 133.9.0.41 address because the remote IP phone 223 is behind the translation device 221.

The firewall in network security device 100 opens a pinhole. A pinhole is a port in the firewall that allows a particular application to access the protected network. The pinholes are listed in a pinhole connection database (not shown). The pinhole allows local IP phone 213 to send packets destined for 133.9.0.41.

The local IP phone 213 begins to send RTP packets. When the firewall sees the first RTP packet, the firewall promotes the pinhole to a full connection as lists the full connection in a promoted connection database.

The call manager 211 sends a message to remote IP phone 223 that local IP phone 213 is placing a call to remote IP phone 223. The message includes the address of the local IP phone 213, for example 195.168.2.215.

The firewall in network security device 100 opens a second pinhole. The second pinhole allows remote IP phone 223 to communicate with local IP phone 213. The remote IP phone 223 begins to send RTP packets to the local IP phone 213.

The call manager 211 has attempted to set up two way communication. However, the call manager 211 is using the control port of the remote IP phone 223, for example the translated address 133.9.0.41/22528. This is because the call manager 211 has no record of the media port of remote IP phone 223. Because of this, the remote IP phone 223 drops all of the packets destined to the control port. The user of the remote IP phone 223 cannot hear the user of the local IP phone 213.

The call manager 211 uses the control port of the remote IP phone 223 because of translation device 221. The translation device 221 is a "dummy device" that does not make any adjustments for VoIP. The translation device 221 performs an address assignment, but the translation device 221 does not change the data going out. The call control packet includes the media port information in the payload.

To avoid this problem, the network of FIG. 2 may include a network security device 100 including the address database 109 of the example embodiments. The firewall in network security device 100 may monitor the traffic from the remote IP phone 223 destined for the local IP phone 213 to determine the media port of remote IP phone 223. Once the media port (e.g. 32746) is known, the firewall in the network security device 100 can change the control port (e.g. 22528) listed in the RTP packets from the local IP phone 213 destined for the remote IP phone 223 to the media port. Thus, the RTP packets are properly handled by remote IP phone 223 and both directions of the call between local IP phone 213 and remote IP phone 223 can be heard by the users.

FIG. 3 illustrates an address database 109 stored by memory 103. As the firewall in network security device 100 receives the traffic from the remote IP phone 223 at external interface 105, network security device 100 builds the address database 109. From the traffic originating at the remote IP phone 223, the media port of remote IP phone 223 is read from the packet header. The media port is to the address database 109, associated with the translation device 221 (PAT device) address.

The internal interface 107 receives a local packet from local IP phone 213 including a destination address that corresponds to the address of the translation device 221. The controller 101 in the network security device 100 queries the address database 109 with the destination address and rewrites a destination port of the local packet with the media port of the remote IP phone 223.

In one implementation, the network security device 100 forwards both directions of traffic. In other words, there may be no bypass of the network security device 100. If the direction of traffic going into local network 210 bypasses the firewall, the network security device 100 does not have the information to properly change the port listed in the RTP packets from the local IP phone 213 destined for the remote IP phone 223 to the media port. The network security device may be set up to perform a NAT or PAT for all locations. This ensures that communications, including both control and media, between locations go through the network security device.

Figure 4:
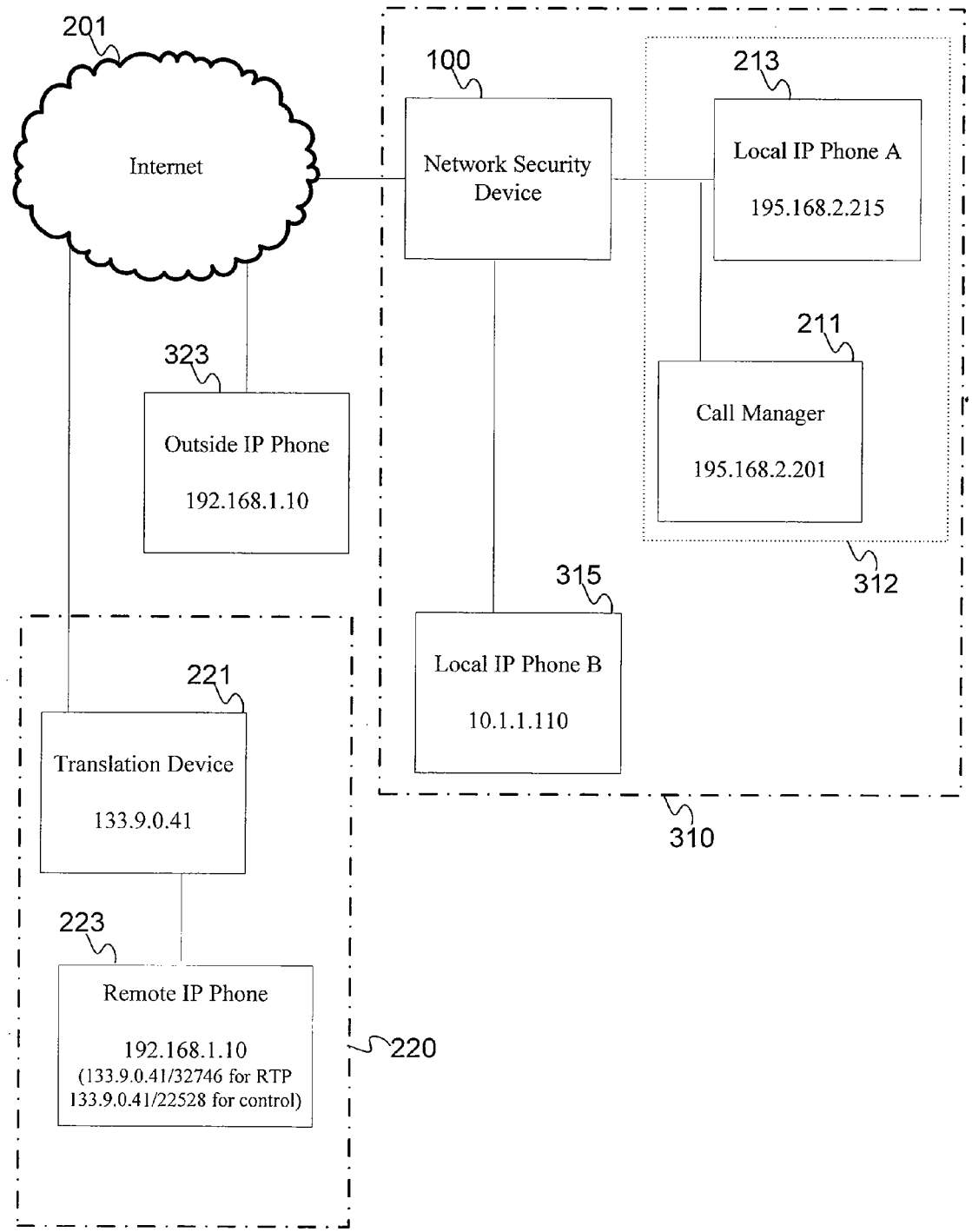
FIG. 4 illustrates one embodiment of another network implementing the network security device of FIG. 1 and a PAT device.

FIG. 4 illustrates one embodiment of another network implementing the network device of FIG. 1. In this example, network security device 100 is coupled with local network 310. The network security device 100 may be a firewall. The local network 310 is divided into one or more subnetworks, including an internal network 312, which may correspond to a department in a company. For example, the human resources offices may be on a different subnetwork than the engineering offices. The internal network 312 includes a local IP phone A 213 and call manager 211, as discussed above.

In this example, the local network 310 also includes a local IP phone B 315. A working two way call from local IP phone B 315 may be made to local IP phone A 213 with or without the benefit of including the address database 109 of the network security device 100.

An additional IP phone on an additional network is represented by outside IP phone 323. If no translation device shields outside IP phone 323 from the public address space, a call to or from outside IP phone 323 may be made with local IP phone A 213 or local IP phone B 315 with or without the benefit of including the address database 109 of the network security device 100.

The local network 310 is in communication with remote network 220, either directly or via the Internet 201. The remote network 220 includes a translation device 221 and a remote IP phone 223. The translation device 221 may be a PAT device.

Using the processes discussed above, calls made between either local IP phone A 213 or local IP phone B 315 and remote IP phone 223 may be made if the network security device 100 includes a fixup process to include the media port of remote IP phone 223 in the RTP packets sent from the local phone to the remote IP phone 223. This can be done using the address database 109.

The memory 103 of network security device 100 may include a fixup address database 501, as shown in FIG. 5, and a promoted connection database 601, as shown in FIG. 6. Using the databases of FIGS. 5 and 6, the network security device 100 may change the port listed in the RTP packets from the local IP phone 213 destined for the remote IP phone 223 to the media port.

Two independent call control connections are established. The call control connections may use SCCP, SIP, or MGCP. As described above, one of the call control connections is between the call manager 211 and the local IP phone A 213, and the other call control connection is between the call manager 211 and the remote IP phone 223.

At least one entry in the fixup address database 501 is populated. Traffic received from the translation device 221 may require a fixup. The network security device 100 detects the address of the translation device 221 in the header and extracts the embedded address of the remote IP phone 223 from the payload of the packet. The address of the translation device 221 is placed in the 'PAT Device Address' column. The embedded (private) address of the remote IP phone 223 is placed in the possible mapped address column. If the two addresses are different, the 'Need Fixup' column is checked, and the session is marked as 'need fixup' as well.

When a call control message is received from call manager 211, the controller 101 queries the fixup address database 501 with the embedded addresses in the call control message. If a match is found and the 'Need Fixup' flag is set, the session is marked as 'need fixup'.

A media pinhole is created, as discussed above. The firewall of the network security device 100 lists the source port of the pinhole with a wildcard for each address with a flag in the need fixup column in the fixup address database 501.

A promoted connection database 601 is created for each interface of the network security device. When the first RTP packet is received from translation device 221, including the media port of remote IP phone 223 embedded in the RTP packet, the pinhole is promoted to a full connection. The promoted connection is added to the promoted connection database 601. The local address column includes the destination address of the RTP packet. The port column includes the control port that was read from the call control message. The media port is added to the fixed port column of the promoted connection database 601.

For the first RTP packets from local IP phone A 213, the local address is queried in the promoted connection database 601 that belongs to the egress interface of the RTP packets. If a match is found, the RTP packets from local IP phone A 213 are changed so that the destination source port of the RTP packets is the corresponding value in the fixed port column of the promoted connection database 601. This query may be performed only once if a match is found.

One example of instructions that could implement the matching technique is the following:

```
static inline boolean remote_nat_match (snp_flow_t *flow,
np_flow_t *f)
{
    return (flow->ifc_in == f->ifc_out &&
        in46_addr_compare(&flow->egress_id->dip, &f->id.sip) == 0 &&
        in46_addr_compare(&flow->egress_id->sip, &f->id.dip) == 0 &&
        flow->egress_id->sport == f->id.dport &&
        flow->egress_id->protocol == f->id.protocol);
}
```

Sometimes, no match is found in the promoted connection database 601 even though a fixup is needed. This may occur when the pinhole connection has not yet been promoted because no RTP packets have been received from the remote IP phone 223. In this case, the network security device 100 may query the pinhole database. If there is a match, the network security device keeps querying the promoted connection database 601 for each RTP packet, until a match is found after the pinhole connection is promoted.

Figure 7:
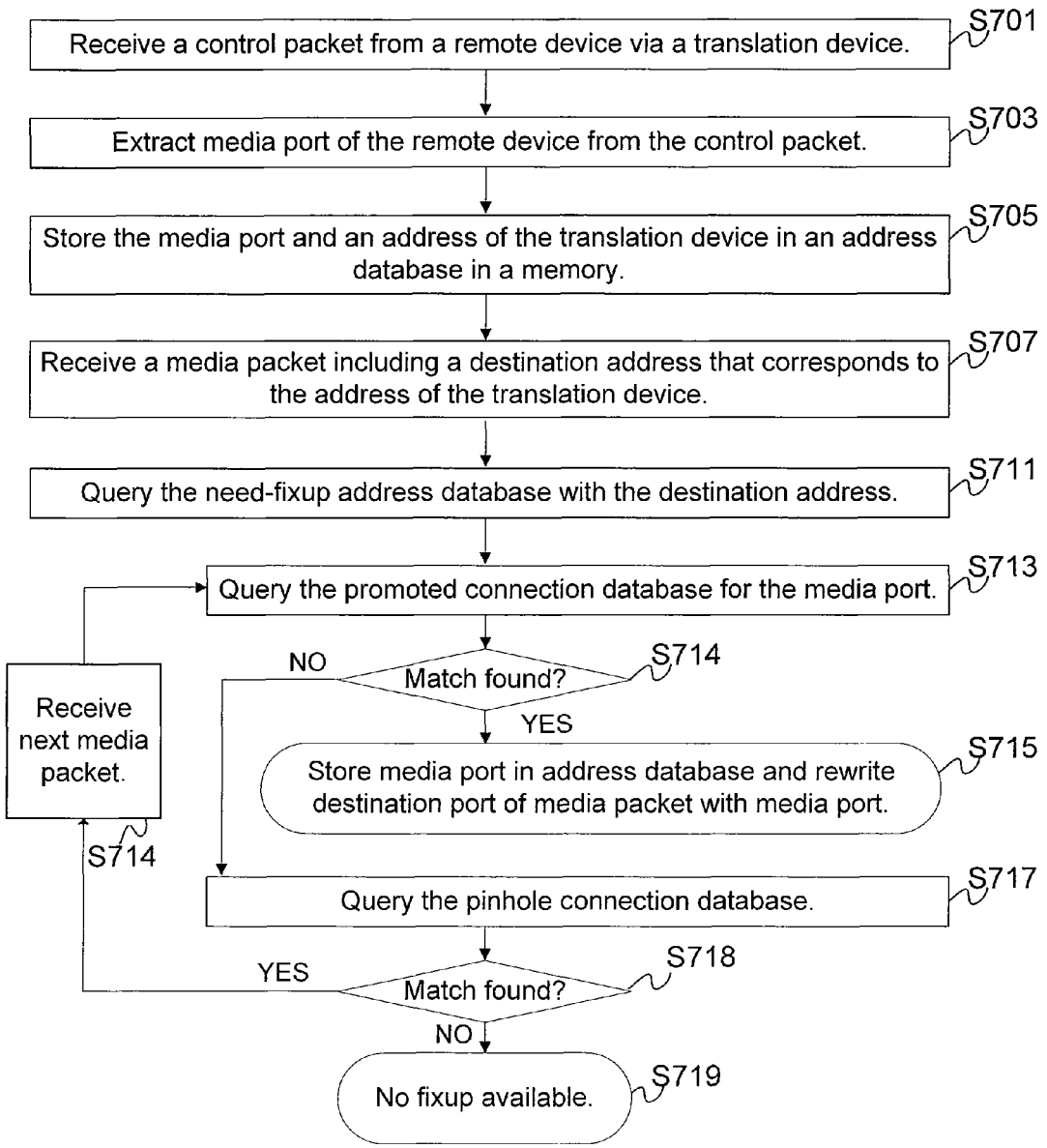
FIG. 7 illustrates a flow chart of the process of routing packets using the network security device of FIG. 1.

FIG. 7 illustrates a flow chart of the process of rerouting packets using the network security device 100. At S701, an apparatus, for example network security device 100, receives a media packet from a remote device, for example remote IP phone 223, via the translation device 221. At S703, the apparatus extracts an embedded media port of the remote device, for example remote IP phone 223, from the remote packet. At S705, the apparatus stores the media port and an address of the translation device 221 in an address database 109 in a memory 103. At S707, the apparatus receives a local media packet including a destination address that corresponds to the address of the translation device 221. At S711, the apparatus queries the need-fixup address database 501 with the destination address.

At S713, the apparatus queries the promoted connection database 601 for the real media port of the remote device. The apparatus determines if a match is found, as shown by decision block S714. If a match is found, the apparatus stores the media port in the address database 109 and rewrites the destination port of the local packet with the media port of the remote IP phone 223, as shown in S715. Accordingly, local packets sent by the local IP phone 213 are changed to include the RTP or media port of the remote IP phone 223, resulting in proper two way communication between the user of the local IP phone A 213 and the remote IP phone B 223.

If a match is not found, at S717, the apparatus queries the pinhole connection database. The apparatus determines if a match is found, as shown by decision block S718. If a match is not found, no fixup is available, as shown by S719. If a match is found, the apparatus receives the next media packet at S714 and returns to S713. The process will continue such that the apparatus continues to query the promoted connection database for each media packet.

Instructions for instructing a network security device in the process discussed above may be stored on any computer readable medium. As used herein, a "computer readable medium" includes, but is not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an application specific integrated circuit (ASIC), a compact disk CD, other optical medium, a random access memory (RAM), a read only memory (ROM), a memory chip or card, a memory stick, and other media from which a computer, a processor or other electronic device can read.

Instructions for the network security device 100 in the process discussed above may be stored on any logic. As used herein, "logic", includes but is not limited to hardware, firmware, software in execution on a machine, and/or combinations of each to perform a function(s) or an action(s). Logic may include, for example, a software controlled microprocessor, an ASIC, an analog circuit, a digital circuit, a programmed logic device, and a memory device containing instructions.

To the extent that the phrase "one or more of, A, B, and C" is employed herein, the phrase is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

Various embodiments described herein can be used alone or in combination with one another. The foregoing detailed description has described only a few of the many possible implementations of the present invention. For this reason, this detailed description is intended by way of illustration, and not by way of limitation.

We claim:

1. An apparatus comprising:
an external interface configured to receive a remote packet from a translation device, wherein a header of the remote packet includes a source address corresponding to the translation device, wherein a payload of the remote packet includes an embedded remote address corresponding to a remote device and a media port of the remote device, and wherein the embedded remote address included in the payload of the remote packet is different than the source address included in the header of the remote packet;
an internal interface configured to receive a local packet including a destination address that corresponds to the address of the translation device; and
a controller configured to rewrite a destination control port of the local packet with the media port of the remote device when the embedded remote address included in the payload of the remote packet is different than the source address included in the header of the remote packet.

2. The apparatus of claim 1, wherein the controller is further configured to query a promoted connection database with the media port and configured to rewrite the destination port of the local packet with the media port when the media port matches an entry in the promoted connection database.

3. The apparatus of claim 2, wherein the controller is further configured to query a pinhole connection database when the media port does not match an entry in the promoted connection database.

4. The apparatus of claim 1, wherein the media port is a real-time transport protocol (RTP) port.

5. The apparatus of claim 1, wherein the remote packet is a call control packet created using voice over internet protocol (VoIP).

6. The apparatus of claim 1, wherein the translation device is a port address translation (PAT) device.

7. The apparatus of claim 1, wherein the apparatus functions as a transparent proxy and performs address translation for packets regardless of source or destination.

8. A method comprising:
determining that an address of a translation device included in a header of a remote packet received at an external interface from the translation device is different than an address of a remote device included in a payload of the remote packet;
storing a media port of the remote device with the address of the translation device in an address database in a memory based on a determination that the address of the translation device included in the header of the remote packet is different than an address of the remote device included in the payload of the remote packet;
receiving a local packet at an internal interface, wherein the local packet includes a destination address that corresponds to the address of the translation device;
querying the address database with the destination address to access the media port of the remote device; and
rewriting a destination control port of the local packet with the media port of the remote device based on a match of the destination address found in the address database.

9. The method of claim 8, wherein the media port is a real-time transport protocol (RTP) port.

10. The method of claim 8, further comprising:
receiving the remote packet from the translation device at the external interface, wherein the payload of the remote packet includes the media port of the remote device.

11. The method of claim 10, wherein the remote packet is a call control packet created using voice over internet protocol (VoIP).

12. The method of claim 11, further comprising:
opening a pinhole connection based on the call control packet.

13. The method of claim 8, wherein the translation device is a port address translation (PAT) device.

14. The method of claim 8, further comprising:
performing address translation for packets received at either the internal interface or the external interface regardless of source or destination.

15. One or more non-transitory media comprising logic executable with a processor to:
store an address database in a memory, wherein the address database includes a media port of a remote device matched with an address of a translation device, wherein the media port of the remote device is determined from traffic received from the remote device that is destined for a local device;
receive a local packet at an internal interface, wherein the local packet includes a destination address that corresponds to the address of the translation device;
query the address database with the destination address;
query a promoted connection database with the media port; and
rewrite a destination control port of the local packet with the media port of the remote device when the media port matches an entry in the promoted connection database.

16. The one or more non-transitory media of claim 15, further comprising logic executable with the processor to:
query a pinhole connection database when the media port does not match an entry in the promoted connection database.

17. The one or more non-transitory media of claim 15, further comprising logic executable with the processor to:

receive a remote packet from the translation device at an external interface, wherein a header of the remote packet includes the address of the translation device and a payload of the remote packet includes an embedded remote address and the media port of the remote device.

18. The one or more non-transitory media of claim 17, wherein the remote packet is a call control packet created using voice over internet protocol (VoIP), and
 wherein the translation device is a port address translation (PAT) device.

19. The one or more non-transitory media of claim 15, further comprising logic executable with the processor to:
 perform address translation for packets received at either the internal interface or the external interface regardless of source or destination.

* * * * *